March 7, 1939.  W. BRUSE  2,149,419
LINK TYPE CONNECTING ROD
Filed Oct. 21, 1938  2 Sheets-Sheet 1
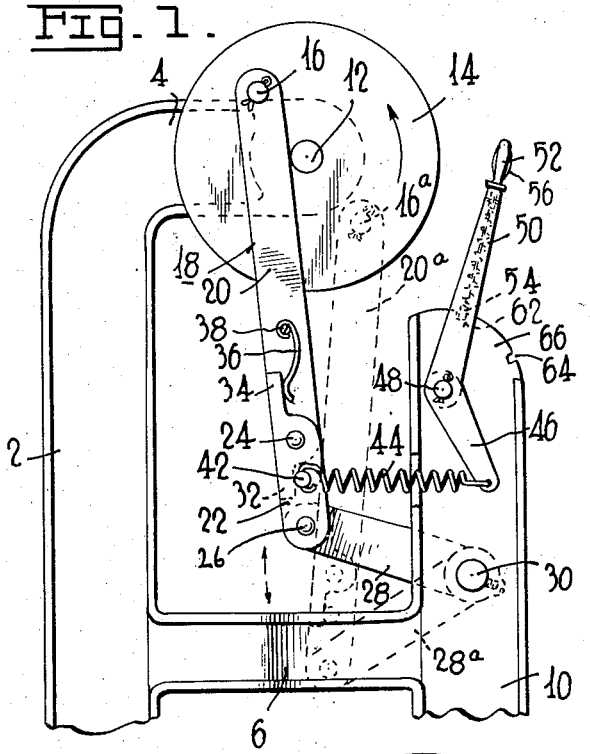
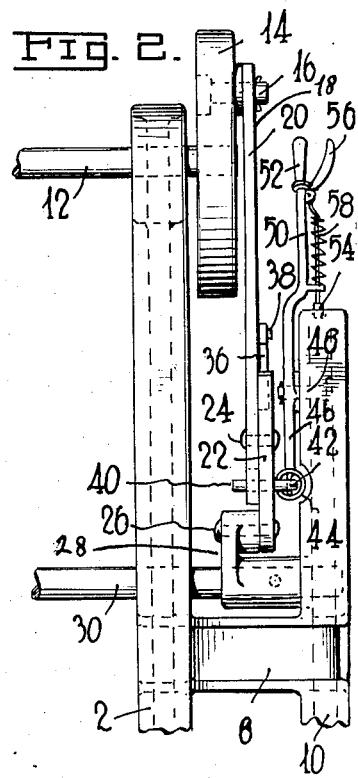
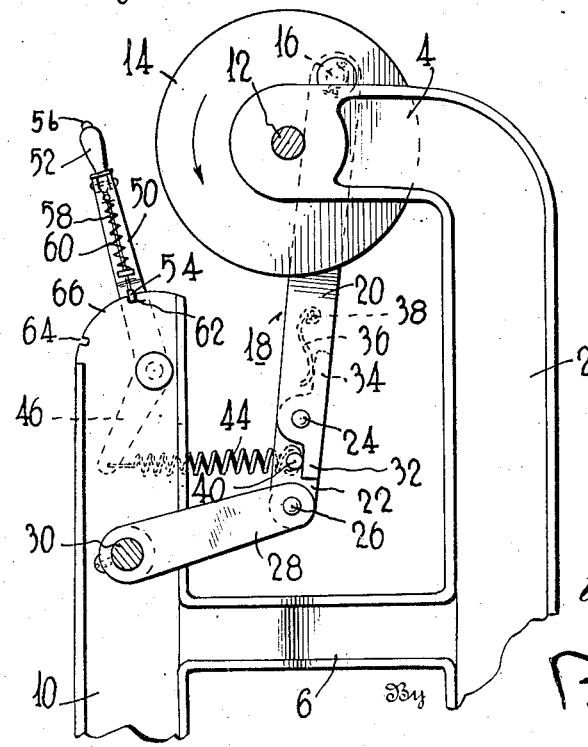
Inventor
*Walter Bruse,*
By
Attorneys March 7, 1939.  W. BRUSE  2,149,419
LINK TYPE CONNECTING ROD
Filed Oct. 21, 1938  2 Sheets-Sheet 2
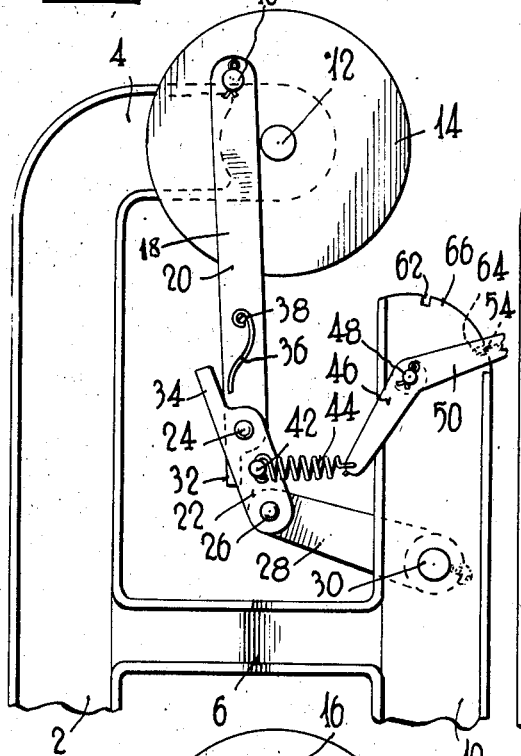
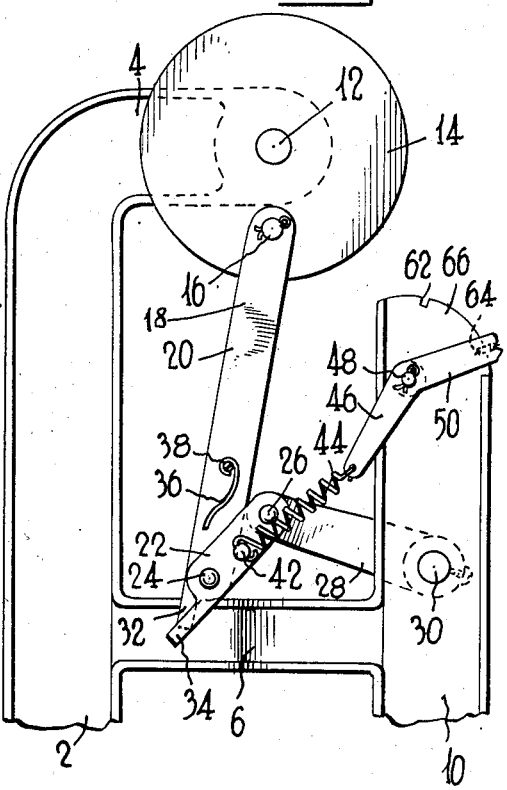
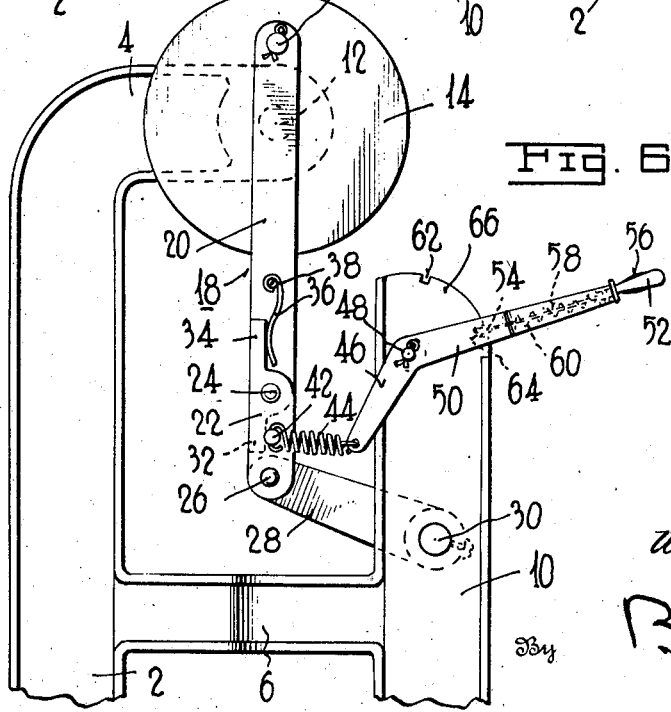
Inventor
Walter Bruse,
By
Attorneys Patented Mar. 7, 1939

2,149,419

UNITED STATES PATENT OFFICE 2,149,419

LINK TYPE CONNECTING ROD

Walter Bruse, Berlin-Sudende, Germany

Application October 21, 1938, Serial No. 236,320
In Germany March 15, 1937

8 Claims. (Cl. 74—584)

The primary object of this invention is to provide a mechanism for translating rotary motion in a driving member into rocking motion in a driven member.

More specifically the invention is in the provision of a connecting rod which, in normal operation, oscillates a lever operatively connected to a driven member and which, when disabled, allows the lever and member to stop while the driving member continues in normal rotation.

The invention has particular application to machines where one or more mechanisms are driven or controlled by a common driving element or master control, and where the driven mechanism is coordinated with the driving part, and, as is frequently the case, with other coordinated driven mechanisms. By operation of the device proposed, any one or more of the driven mechanisms may be stopped without stopping the driving element, and by further operation, the driven element may be again put into operation so that it assumes its original synchronous relationship with the driving element and the other coordinated mechanisms.

In known arrangements embodying connecting rods of the link type, it is usual to hold the links slightly out of effective alignment and to inhibit breaking by means of a coil spring so that, in case of overload, the links pivot to inoperative nonalignment when the applied force overcomes the spring. This invention, on the other hand, provides a link-type rod in which the links, when operative, are in true alignment, so that any force up to the structural limits of the machine elements may be transmitted by the rod.

A further object is to provide a connecting rod of the link type wherein, upon operation of the disabling mechanism, a positive force of the device itself causes the links to break, and which will continue to break the links upon continuation of the machine cycles until operatively reconnected.

Other objectives are the overcoming of dead-centre phases of the operative cycle, elimination of substantial play, and the provision of positive and infallible indication of the operativeness or inoperativeness of the device.

Complete understanding of the invention may be had from the following specification and drawings, in which:

Fig. 1 is a vertical front elevation;
Fig. 2 is an end elevation;
Fig. 3 is a vertical rear elevation;
Figs. 4, 5 and 6 are vertical front elevations similar to Fig. 1 showing progressive phases of the inoperative cycle.

In the drawings of an embodiment of the invention, the supporting framework 2 includes a top arm 4, a cross beam 6, a beam 8, and the vertical support 10.

Journalled in the top arm 4 is a drive shaft 12 which is connected to a source of power not shown. The crank wheel 14, which is mounted on the drive shaft 12, has a crank pin 16 to which is hung the connecting rod 18. The connecting rod 18 is formed of an upper link 20 and a lower link 22, which have a common pivot 24. The connecting rod 18 is pivotally attached at its lower end by the pivot pin 26 to one end of the lever 28. Lever 28, at its other end, is attached to the shaft 30, hereinafter called the driven shaft 30.

As shown best in Figs. 1, 2 and 3, upper and lower links 20 and 22 have projections 32 and 34, respectively, which extend in each case substantially beyond the common pivot 24. A leaf spring 36 is attached at its upper end to upper link 20 by the screw 38 and bears against projection 34 of the lower pivot 22 so that the leaf spring is normally under compression when links 20 and 22 are extended as shown in Figs. 1, 2, 3 and 6.

As shown particularly in Figs. 2 and 3, lower link 22 has, on its other side, a stop 40 which, when the links are in aligned extension, engages against, and thereby blocks projection 32 of the upper link. In the embodiment shown, stop 40 is a stud which passes through lower link 22 and provides the attachment 42 on the front side of the link for holding one end of the coil spring 44.

Coil spring 44 is anchored at its other end to the bell-crank lever 46, which is mounted on the vertical support 10 of the frame 2 by the lever pivot 48. The bell-crank lever 46 includes the operating arm 50, on the end of which is shown a handle 52. Also carried by the operating arm 50 are the detent 54 and detent operator 56 which, through the rod 58 and spring 60, controls the detent to and from engagement with either the upper or lower notches 62 or 64, respectively, in the segment 66 which is at the upper end of the vertical support 10.

In normal operation, the bell-crank lever 46 is in the position shown in Figs. 1, 2 and 3 that is, with the detent 54 engaged in the upper notch 62 so that coil spring 44 is extended. Extension of coil spring 44 causes links 20 and 22 to remain aligned, with the projection 32 of upper link 20 engaged against stop 40 on lower link 22.

When coil spring 44 is extended, links 20 and 22 are pulled to an aligned position against stop 40 which prevents them from breaking in the direction of the coil spring 44. And since the tension of coil spring 44 is substantially greater than the force of leaf spring 36, which otherwise would break the links in a direction away from the coil spring, the links will remain aligned and effectively rigid.

While links 20 and 22 remain aligned, connecting rod 18 causes lever 28 to oscillate and thereby rock the driven shaft 30 when rotary power is applied to turn the crank wheel 14 in the direction of the arrow by the drive shaft 12.

The full lines in Fig. 1 show the connecting rod 18 during the down stroke, and the dotted lines show, and the reference numerals 16a, 18a, 28a, and 44a indicated, respectively, the crank pin, connecting rod, lever, and coil spring during the up stroke.

As may be seen from the figures, stop 40 prevents the links 20 and 22 from breaking in the direction towards the shaft 12 of the crank pin 6 and wheel 14 during the stroke of the crank towards the lever 28 and driven shaft 30, thus preventing any lateral thrust towards the driven shaft 30 from breaking the links from alignment.

Passing now to Figs. 4, 5 and 6, the disabling mechanism has been placed in operation. For any one of a number of reasons, the operator has desired to stop the rocking movement of driven shaft 30 without stopping the rotation of driving shaft 12. Accordingly, the detent operator 56 was pressed towards the handle 52 and the detent 54 was thereby raised from the upper notch 62 so that the bell-crank lever 46 could be pivoted to the position shown in Figs. 4 to 6. The bell-crank lever 46, having been swung to its new position, and the detent 54 now having been engaged in lower notch 64, the coil spring 44 is shown in its relaxed position so that it no longer exerts tension for holding the links 20 and 22 aligned.

With the coil spring 44 relaxed, then leaf spring 36 flexes the links by exerting its force against the projection 34 of lower link 22. The positive action of the leaf spring 36 starts the breaking of the links, and once they have pivoted but slightly out of alignment, a free pivoting may then occur.

Fig. 4 shows the links after the coil spring 44 has been relaxed and the leaf spring 36 has caused the links to pivot from alignment, and the free pivotal movement between the links has begun as the down stroke gets under way.

As shown in Fig. 5, the arm 28 and driven shaft 30 have remained stationary, but the crank wheel has been turned one-half a revolution and the links have pivoted freely to a completely broken position.

In Fig. 6, the crank wheel 14 has completed one revolution and leaf spring 36 will, upon continued rotation of the crank wheel 14, break the links again in the manner above described. If, however, during any part of the cycle shown in Figs. 4, 5 and 6, operating arm 50 is returned to its original position as shown in Figs. 1 and 3, links 20 and 22 will be pulled into and held in alignment against the stop 40 by coil spring 44. This will restart the operating cycle first described, with the driven shaft in its original synchronism with drive shaft 12.

In the embodiment shown, the lower link 22 is of sufficient length with respect to the length of crank stroke that it is impossible for the links to pivot from true alignment, or 180 degree, to a 360 degree position where they might prevent the crank from completing a revolution. The stop member 40 also serves to prevent such an occurrence by engaging against the upper link 5 at the bottom of the down stroke of the crank.

It may easily be seen whether the links are operatively or inoperatively connected by observing the condition of coil spring 44. If the coil spring is relaxed, it is impossible for the links to remain aligned.

Thus, by one simple operation, the connecting rod may be disabled so that the driving shaft can continue to rotate without interruption, but the driven shaft may be stopped.

The disabling of the rod is not dependent upon any excess force, or any application of positive external force, but is accomplished positively and independently by the mechanism itself.

By reversing the disabling movement, the rod is automatically replaced into operation. The driven shaft cannot become non-synchronous with the driving shaft when the connecting rod is operative, and replacement into operation must always occur at the same phase of the operating cycle.

Let it be understood that the invention may be applied in many forms without deviating from the basic concept which is to be measured only by this contribution to the art, and by the following claims.

I claim:

1. A connecting rod of the type described, comprising a pair of links pivoted together, stop means for limiting relative angular movement between said links in one direction, second means for urging relative angular movement between said links in an opposite direction, a third means, said third means being operatively opposed to, and effectively stronger than the second mentioned means whereby normally to overcome the same and thereby normally to urge said links in said first mentioned direction, and means for rendering said third means inoperative.

2. A connecting rod of the type described, comprising a pair of links pivoted together, and normally aligned, blocking means for allowing said links to break only in one direction, a first resilient means operatively connected to one of said links for normally holding said links in alignment, second resilient means operatively connected to one of said links and opposed to the first, said second resilient means being normally overcome by the first, and means for rendering said first means inoperative whereby said second means breaks said links.

3. A connecting rod of the type described, comprising a pair of links pivoted together, and normally aligned, a stop rigid with the first of said links and engageable by the second for preventing said second link from pivoting from alignment with the first in one direction, resilient means attached to one of said links and engageable with the other for normally urging said other link to pivot from alignment in the opposite direction when said links are aligned, second resilient means operatively opposed to, and effectively stronger than the first mentioned resilient means for normally urging said second link against said stop whereby to hold said links in alignment, and means for rendering said second resilient means inoperative, thereby allowing the first mentioned resilient means to pivot said second link from alignment with the first.

4. A connecting rod of the link type comprising first and second links pivoted together by a common pivot and normally aligned to form an operative connection, each of said links having projections extending beyond said common pivot, the first of said links having a stop member thereon and engageable with the projection of the second for preventing said links from breaking in one direction, the second of said links having a spring secured thereto and engaged against the projection of the first when said links are aligned for normally urging said links to break in the other direction, a second spring operatively opposed to, and effectively stronger than said first spring attached to one of said links for holding said first and second links in alignment with the stop member and projection of the second link in engagement with one another, and means for rendering said second spring inoperative whereby to allow the first spring to break said links.

5. A link type connecting rod for translating rotary motion of a driving shaft having a crank into rocking motion in a driven member having a lever fixed at one end thereto, comprising first and second links pivoted together by a common pivot at their inner ends and operatively connected at their outer ends to said crank and the other end of said lever, respectively, said links being substantially aligned when operative to form a connection between said crank and said lever, blocking means attached to one of said links and engaged with the other when said links are aligned for preventing said links from breaking in the direction towards the shaft of said crank during the driving stroke of said crank, resilient means for normally urging said links to break in a direction opposite from the first mentioned direction, second resilient means operatively opposed to and effectively stronger than the first mentioned resilient means for urging the other of said links against said blocking means whereby normally to maintain said links substantially in alignment, and means for rendering said second resilient means inoperative.

6. A link type connecting rod for translating rotary motion of a driving shaft having a crank into rocking motion in a driven member having a lever fixed at one end thereto, comprising first and second links pivoted together by a common pivot at their inner ends and operatively connected at their outer ends to said crank and the other end of said lever, respectively, said links being substantially aligned when operative to form a rigid connection between said crank and said lever for oscillating said lever upon rotation of said crank, each of said links having a projection extending beyond said common pivot, one of said links having a stop member thereon, said stop member being adapted and arranged to prevent said links from breaking towards the shaft of said crank during the driving stroke of said crank, a leaf spring attached to one of said links and engageable with the projection of the other so as to be compressed thereby when said links are operatively aligned, thereby normally urging said links to break from alignment, a coil spring attached to one of said links, said coil spring being operatively opposed to, and effectively stronger than, said leaf spring whereby to hold the said projection against said stop, and means for releasing said coil spring whereby to allow said leaf spring to break said links.

7. A link type connecting rod for translating rotary motion of a driving shaft having a crank into rocking motion in a driven member having a lever fixed at one end thereto, comprising an upper link operatively connected at its upper end to said crank and pivoted at its lower end to a lower link, a lower link pivoted at its upper end to the upper link and operatively connected at its lower end to said lever, a common pivot connecting said links, said upper links each having a projection extending beyond said common pivot, said lower link having a stop member fixed thereto, said stop member being engageable with the projection on said upper link and adapted and arranged, when said links are operatively aligned, to be between said projection on said upper link and said driven member, thereby preventing said links from breaking from alignment towards said driven member, a leaf spring fixed at one end to said upper lever and engageable with the projection on said lower member, said leaf spring being adapted and arranged so that, when said links are aligned, to be compressed by the projection on said lower member and tending to cause said links to break in a direction away from said driven member, a coil spring being normally under tension and adapted and arranged to pull said links towards said driven member and to overcome said leaf spring, thereby holding said links in alignment, and means for moving the point of anchorage of said coil spring towards said links to release the tension thereof whereby to allow said links to break in a direction away from said driven member.

8. A link type connecting rod as claimed in claim 7, and means for preventing said links from pivoting from 180 degree alignment to 360 degree alignment.

WALTER BRUSE.